2,852,337
PROCESSES OF CHLORINATION OF URANIUM OXIDES

Sam Rosenfeld, Los Angeles, Calif., assignor to the United States of America as represented by the United States Atomic Energy Commission No Drawing. Application November 6, 1945
Serial No. 627,107

10 Claims. (Cl. 23—14.5)

The present invention relates to processes of producing uranium tetrachloride through chlorination of uranium oxides, and more particularly to such processes using carbon tetrachloride and the various oxides of uranium.

It is an object of the invention to provide an improved process of producing uranium tetrachloride of high chemical purity in crystalline form, wherein a majority of the product has a relatively large crystalline grain size.

Another object of the invention is to provide an improved carbon tetrachloride and uranium oxide process in which the vapor phase chlorination of a stationary uranium oxide charge may be effected more rapidly and completely than heretofore.

Another object of the invention is to provide an improved carbon tetrachloride and uranium oxide process of producing uranium tetrachloride which does not require agitation or rotation of the charge to effect rapid and complete chlorination.

Another object of the invention is to provide an improved carbon tetrachloride and uranium oxide process of producing uranium tetrachloride in which a stationary uranium oxide charge is disposed within the chlorination zone to provide sufficient surface for contact of the chlorinating agent to enable most rapid and complete chlorination.

Another object of the invention is to provide a method for disposing a uranium oxide charge within a vapor phase chlorinating zone so that chlorination to produce uranium tetrachloride is effected more rapidly and completely than heretofore.

Still another object of the invention is to provide an improved process of producing uranium tetrachloride in which a stationary charge of uranium oxide is disposed in thin layers in a reaction zone and contacted with a chlorinating agent in the vapor phase, whereby rapid and complete chlorination to uranium tetrachloride is affected, and side reactions productive of other uranium chlorides and other objectionable compounds are minimized.

Still another object of the invention is to provide an improved process of producing uranium tetrachloride which employs reactions of a mixture of carbon tetrachloride and phosgene with an oxide of uranium.

The invention both as to its organization and method of operation together with further objects and advantages thereof will best be understood by reference to the following specification.

In a copending application of James M. Carter, Serial No. 490,293, filed June 10, 1943, which issued as Patent No. 2,677,592, on May 4, 1954, there is disclosed a process for the production of $UCl_4$ which employs reactions of a chlorinating agent such as $CCl_4$ with an oxide of uranium. In accordance with the process, a suitable charge of uranium oxide ($UO_2$, $UO_3$ or $U_3O_8$) is placed in a reaction chamber surrounded by a heater and heated to a reaction temperature, the interior of the reaction chamber near the charge being maintained at a temperature within the range 425° to 475° C. and as near 450° C. as practicable. Liquid $CCl_4$ is conducted through a conduit arranged adjacent the reaction chamber and surrounded by the heater, whereby the $CCl_4$ is converted into the vapor phase and heated to a temperature of the order of 500° C. The hot $CCl_4$ vapor is then conducted into the interior of the reaction chamber into direct contact with the charge of uranium oxide, whereby the hot $CCl_4$ vapor reacts with the hot charge of uranium oxide to produce uranium tetrachloride and certain reaction gases, including CO, $CO_2$, $COCl_2$, and $Cl_2$. The reaction gases and the unspent $CCl_4$ vapor are conducted from the reaction chamber through a suitable condenser, whereby the unspent $CCl_4$ vapor is condensed and the reaction gases are exhausted. Preferably, the condensed $CCl_4$ is again conducted to the conduit for reconversion into the vapor phase, whereby the unreacted $CCl_4$ is recycled repeatedly.

During the process, additional $CCl_4$ is supplied as it is consumed in the reaction with the charge of uranium oxide, and the process is continued until all of the charge of uranium oxide has been converted into $UCl_4$. At this time, when the reaction of the charge of uranium oxide is complete, the evolution of reaction gases ceases, thereby providing a ready indication of the completion of the process. Further, it is noted that $COCl_2$ produced as a reaction gas is appreciably soluble in $CCl_4$, whereby the charge of uranium oxide is reacted with a mixture of $CCl_4$ vapor and $COCl_2$ after the process is initiated. Thus, the $COCl_2$ also reacts with the charge of uranium oxide to produce $UC_4$. The fact that $COCl_2$ reacts with the charge of uranium oxide to produce $UCl_4$ is menifest by the consumption of less than two moles of $CCl_4$ to produce one mol of $UCl_4$, as more clearly indicated hereinafter.

Ordinarily, the process requires approximately four and one-half hours to complete the reaction at the reaction temperature mentioned, whereby substantially all of the charge of uranium oxide is converted into $UCl_4$ and appears in crystalline form of dark green color.

While the process may be carried out at a reaction temperature below the lower end of the preferred range, at a temperature of 400° C., for example, in order to produce $UCl_4$, this product so produced is in the form of a rather fine greenish colored powder and has a tendency to lump very badly. In addition, the reaction proceeds much more slowly. Similarly, while the process may be carried out at a reaction temperature above the upper end of the preferred range, at a temperature of 500° C., for example, in order to produce $UCl_4$ of the desired crystalline structure, the side reactions productive of other uranium chlorides, such as $UCl_5$, and various other objectionable compounds such as $C_2Cl_6$, from breakdown of $CCl_4$ at this temperature are exceedingly objectionable in that the $UCl_5$ escapes from the apparatus and clogs feed and exit lines; the product may be contaminated with $UCl_5$, $C_2Cl_6$, and other substances, and large amounts of $CCl_4$ are wasted. On the other hand, when the process is carried out at a reaction temperature within the preferred range, substantially complete conversion of the charge is effected, and the product is of a very high chemical purity and of the desired crystalline form. Also in this event, a minimum amount of $CCl_4$ is utilized in the reaction and side reactions productive of other uranium chlorides and other objectionable compounds are minimized. This product so produced, having the desired crystalline structure, is particularly well-suited for use in vacuum apparatus in which it may be vaporized or sublimed in carrying out other processes or methods, in that the product being of relatively large crystalline structure may be readily out-gassed, and has little tendency to be transported as dust in the vacuum apparatus.

It is to be noted that in the course of carrying out the above, it is necessary from time to time to rotate the charge or at least tap or shake the reaction chamber at suitable time intervals in order to prevent caking of the product and to cause the unreacted portion of the charge to be presented to the surface of the mass to be contacted with reactant gases and reacted. In the absence of agitation, the reaction of carbon tetrachloride with uranium oxide penetrates only to a certain depth beyond which a very hard cake would form.

In accordance with the present invention, it has been found that if it is desired to maintain the charge stationary during the reaction, incomplete chlorination of the charge may be eliminated by disposing or spreading the uranium oxide charge in relatively thin layers on trays to provde a large surface for contact of the chlorinating vapor. It has been found that the most suitable product both as to quality and physical form will be obtained when the depth of the charge in the tray is held between 0.1 and 0.5 cm. At no place within the trays should the charge depth be more than 0.5 cm. and it is best to dispose the charge in a slight mound on the tray, thereby providing for less than a 0.5 cm. depth near its periphery. Thus, a minimum amount of $CCl_4$ is utilized in the reaction and side reactions productive of other uranium chlorides and other objectionable compounds are minimized. The product so produced has the most desirable crystalline structure. It is particularly well suited for use in vacuum apparatus in which it may be vaporized or sublimed in carrying out other processes or methods, in that the product, being of relatively large crystalline structure, may be readily outgassed and has little tendency to be transported as dust in the vacuum apparatus.

After $UCl_4$ has been produced in accordance with the present process it is removed from the reaction chamber into a dried container and maintained under a storage atmoshpere of $CO_2$. Subsequently the product is transferred to a dry cabinet containing $CO_2$ and screened in order to separate undesirable ends and a minor portion of the product in fine powdered form. The usable product is then bottled in an atmosphere of $CO_2$ or in a vacuum and sealed for future use in vacuum apparatus or otherwise as may be desired.

It is pointed out that the oxide of uranium preferred as a charge in this reaction is $UO_2$ in that it has several advantages over the other oxides mentioned. A charge of $UO_2$ reacts much more readily than a charge of either $U_3O_8$ or $UO_3$, a charge of $UO_3$ reacting most slowly of the three uranium oxides mentioned. Also in $UO_2$ the uranium is already in the same valence state as it is in the product $UCl_4$. No chlorine is produced in the reaction and there is accordingly less tendency to form $UCl_5$ and other objectionable compounds. Finally as a corollary of the fact that a charge of $UO_2$ is most rapidly converted this more rapid reaction is advantageous in avoiding the formation of $UCl_5$ and other objectionable compounds as the reaction temperature can be kept towards the lower end of the preferred range.

While there has been described what is at present considered to be the preferred embodiment in the process, it will be understood that various modifications may be made therein and it is intended to cover in the appended claims all such modifications as fall within the true spirit and scope of the invention.

What is claimed is:

1. In the process comprising contacting carbon tetrachloride vapor with an oxide of uranium at a reaction temperature within the range 425° to 475° C., whereby uranium tetrachloride and reaction gases including phosgene are produced, condensing the unreacted carbon tetrachloride vapor, whereby carbon tetrachloride is separated thereby dissolving some of the phosgene from the remainder of the reaction gases, and reconverting the liquid carbon tetrachloride and dissolved phosgene into vapor to be contacted again with the unreacted oxide of uranium, whereby the unreacted carbon tetrachloride and some of the phosgene are recycled repeatedly and maintaining the temperature within said range until the oxide is substantially completely converted to crystalline uranium tetrachloride, the major portion of the product having a crystalline size between 10 and 60 mesh; the improvement consisting of disposing the oxide of uranium charge in trays within the reaction zone to a depth of between 0.1 and 0.5 centimeter whereby the reaction is rapidly and completely effected.

2. In a large-scale process comprising reacting carbon tetrachloride vapor with an oxide of uranium at a reaction temperature within the range 425° to 475° C., and maintaining the temperature within said range until the oxide is substantially completely converted to crystalline uranium tetrachloride, the major portion of the product having a crystal grain size between 10 and 60 mesh; the improvement comprising disposing the oxide of uranium charge in expansive layers of 0.1 to 0.5 cm. in thickness in the reaction zone whereby a more complete and rapid reaction is effected.

3. In a large-scale process comprising reacting $CCl_4$ vapor with $UO_2$ at a reaction temperature within the range 425° to 475° C., and maintaining the temperature within said range until the oxide is substantially completely converted to crystalline $UCl_4$, the major portion of the product having a crystal grain size between 10 and 60 mesh; the improvement comprising disposing a large charge of said $UO_2$ in open containers within a reaction zone to a depth of between 0.1 and 0.5 centimeter in expansive layers, whereby the reaction to form said crystalline $UCl_4$ is rapidly and completely effected.

4. In a large-scale process comprising reacting $CCl_4$ vapor with $UO_3$ at a reaction temperature within the range 425° to 475° C., and maintaining the temperature within said range until the oxide is substantially completely converted to crystalline $UCl_4$, the major portion of the product having a crystal grain size between 10 and 60 mesh; the improvement comprising disposing a large charge of said $UO_3$ in trays within the reaction zone to a depth of between 0.1 and 0.5 centimeter in expansive layers, whereby the reaction to form said crystalline $UCl_4$ is rapidly and completely effected.

5. In a large-scale process comprising reacting $CCl_4$ vapor with $U_3O_8$ at a reaction temperature within the range 425° to 475° C., and maintaining the temperature within said range until the oxide is substantially completely converted to crystalline $UCl_4$, the major portion of the product having a crystal grain size between 10 and 60 mesh; the improvement comprising disposing a large charge of said $U_3O_8$ in trays within the reaction zone to a depth of between 0.1 and 0.5 centimeter in expansive layers, whereby the reaction to form said $UCl_4$ is rapidly and completely effected.

6. The process as defined in claim 1 wherein said oxide of uranium which is reacted with said carbon tetrachloride is a material selected from the group consisting of $UO_2$, $U_3O_8$, and $UO_3$.

7. In the process comprising contacting carbon tetrachloride vapor with a material selected from the group consisting of $UO_2$, $U_3O_8$, and $UO_3$ at a reaction temperature of 450° C., whereby uranium tetrachloride and reaction gases including phosgene are produced, condensing the unreacted carbon tetrachloride vapor, whereby carbon tetrachloride is separated thereby dissolving some of the phosgene from the remainder of the reaction gases, and reconverting the liquid carbon tetrachloride and dissolved phosgene into vapor to be contacted again with the unreacted oxide of uranium, whereby the unreacted carbon tetrachloride and some of the phosgene are recycled repeatedly and maintaining the temperature at 450° C. until said material is substantially completely converted to crystalline uranium tetrachloride, the major portion of the product having a crystalline size between 10 and 60 mesh; the improvement consisting of disposing said material in trays within the reaction zone to a depth of between 0.1 and 0.5 centimeter whereby the reaction is rapidly and completely effected.

8. The method as defined in claim 1 wherein said oxide of uranium comprises $UO_2$.

9. The method as defined in claim 1 wherein said oxide of uranium comprises $UO_3$.

10. The method as defined in claim 1 wherein said oxide of uranium comprises $U_3O_8$.

References Cited in the file of this patent

UNITED STATES PATENTS

| | | |
|---|---|---|
| 1,179,394 | Barton | Apr. 18, 1916 |
| 1,646,734 | Marden | Oct. 25, 1927 |
| 2,401,543 | Brallier | June 4, 1946 |

OTHER REFERENCES

Chem. Abstracts, vol. 5, page 1036, Ed. Chauvenet, Compt. rend., 152, 87–9.

Colani: Recherches sur les composes uraneux, Annales de Chimie et de Physique, 8th Ser., vol. 12, pages 69–7 (1907).

Mellor: Comprehensive Treatise of Inorganic and Theoretical Chemistry, vol. 12, pages 80 and 83 (1932).